US010273351B2

(12) United States Patent
Pavon Sierra et al.

(10) Patent No.: US 10,273,351 B2
(45) Date of Patent: Apr. 30, 2019

(54) RUBBER MIXTURE AND VEHICLE TIRES

(71) Applicant: Continental Reifen Deutschland GmbH, Hannover (DE)

(72) Inventors: Viktoria Pavon Sierra, Hannover (DE); Norbert Mueller, Nienhagen (DE); Catarina Sá, Isernhagen (DE); Thorsten Torbruegge, Langenhagen (DE); Christoph Vatterott, Seelze (DE); Anette Stark, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/836,401

(22) Filed: Dec. 8, 2017

(65) Prior Publication Data

US 2018/0100058 A1  Apr. 12, 2018

Related U.S. Application Data

(63) Continuation of application No. PCT/EP2016/056200, filed on Mar. 22, 2016.

(30) Foreign Application Priority Data

Jun. 8, 2015 (DE) .................. 10 2015 210 424

(51) Int. Cl.
| | | |
|---|---|---|
| C08L 9/00 | (2006.01) |
| B29B 7/74 | (2006.01) |
| C08L 9/06 | (2006.01) |
| B60C 1/00 | (2006.01) |
| C08K 3/02 | (2006.01) |
| C08K 3/04 | (2006.01) |
| C08L 7/00 | (2006.01) |
| C08L 23/26 | (2006.01) |
| C08C 19/20 | (2006.01) |
| C08C 19/25 | (2006.01) |
| C08K 3/36 | (2006.01) |
| C08L 23/20 | (2006.01) |

(52) U.S. Cl.
CPC .............. *C08L 9/00* (2013.01); *B29B 7/7495* (2013.01); *B60C 1/0016* (2013.01); *C08C 19/20* (2013.01); *C08C 19/25* (2013.01); *C08K 3/02* (2013.01); *C08K 3/04* (2013.01); *C08K 3/36* (2013.01); *C08L 7/00* (2013.01); *C08L 9/06* (2013.01); *C08L 23/20* (2013.01); *C08L 23/26* (2013.01); *C08K 2003/023* (2013.01); *C08L 2201/52* (2013.01); *C08L 2205/02* (2013.01); *C08L 2312/00* (2013.01)

(58) Field of Classification Search
CPC ..... B29B 7/7495; B60C 1/0016; C08L 23/20; C08L 7/00; C08L 23/26; C08L 9/06; C08L 2205/02; C08L 2201/52; C08L 2312/00; C08K 3/36; C08K 3/02; C08K 3/04; C08K 2003/023
See application file for complete search history.

(56) References Cited

U.S. PATENT DOCUMENTS

| | | |
|---|---|---|
| 3,281,389 A | 10/1966 | Hirshfield |
| 4,840,988 A | 6/1989 | Nakayama et al. |
| 6,242,523 B1 | 6/2001 | Blok et al. |
| 6,550,508 B1 | 4/2003 | Yamaguchi et al. |
| 7,411,018 B2 | 8/2008 | Appel et al. |
| 7,968,633 B2 | 6/2011 | York et al. |
| 7,968,634 B2 | 6/2011 | York et al. |
| 7,968,635 B2 | 6/2011 | York et al. |
| 7,968,636 B2 | 6/2011 | York et al. |
| 8,182,626 B2 | 5/2012 | Recker et al. |
| 8,252,863 B2 | 8/2012 | Hasse et al. |
| 8,580,885 B2 | 11/2013 | Ohta et al. |
| 2002/0082333 A1 | 6/2002 | Herpich et al. |
| 2008/0110544 A1 | 5/2008 | Nakamura |
| 2009/0137701 A1* | 5/2009 | Hirabayashi .......... B60C 1/0016 523/157 |
| 2009/0137718 A1* | 5/2009 | Hirabayashi .......... B60C 1/0016 524/496 |
| 2013/0131240 A1 | 5/2013 | Uekita et al. |

FOREIGN PATENT DOCUMENTS

| | | |
|---|---|---|
| JP | 2005-146115 A | 6/2005 |
| JP | 2005-350603 A | 12/2005 |
| WO | 99/09036 A1 | 2/1999 |

OTHER PUBLICATIONS

International Search Report dated Jun. 20, 2016 of international application PCT/EP2016/056200 on which this application is based.
Patent Cooperation Treaty PCT Third Party Submission dated Aug. 23, 2017 in international application PCT/EP2016/056200 on which this application is based.

* cited by examiner

*Primary Examiner* — Nathan M Nutter
(74) *Attorney, Agent, or Firm* — Walter Ottesen, P.A.

(57) ABSTRACT

Disclosed are sulfur-crosslinkable rubber mixtures that can be incorporated into treads of vehicle tires, and vehicle tires comprising the disclosed sulfur-crosslinkable rubber mixtures. The rubber mixtures comprise: at least one diene rubber, at least one silica, at least one hydrocarbon resin, and 1 to 40 phr of at least one liquid polybutadiene having terminal organosilicon modification and having a weight-average molecular weight Mw by GPC of 500 to 12 000 g/mol.

11 Claims, No Drawings

RUBBER MIXTURE AND VEHICLE TIRES

CROSS REFERENCE TO RELATED APPLICATIONS

This application is a continuation application of international patent application PCT/EP2016/056200, filed Mar. 22, 2016 designating the United States and claiming priority from German application 10 2015 210 424.9, filed Jun. 8, 2015, and the entire content of both applications is incorporated herein by reference.

FIELD OF THE INVENTION

Disclosed are sulfur-crosslinkable rubber mixtures, particularly for use in treads of vehicle tires, and vehicle tires comprising the disclosed sulfur-crosslinkable rubber mixtures.

BACKGROUND OF THE INVENTION

Since the running properties of a tire, especially of a pneumatic vehicle tire, depend to a great extent on the rubber composition of the tread, particularly high demands are placed on the composition of the tread mixture. The partial or complete replacement of the carbon black filler with silica in rubber mixtures has brought the running properties to a higher level overall over the past few years. However, the known trade-offs in the tire properties that behave in a contrary fashion also continue to exist in silica-containing tread mixtures. For instance, an improvement in wet grip and in dry braking still generally entails a deterioration in rolling resistance, in winter properties and in abrasion characteristics.

In order to resolve the trade-offs in the tread, various approaches have already been pursued. For example, a wide variety of different polymers, including modified polymers, resins, plasticizers and finely divided fillers have been used for rubber mixtures, and attempts have been made to influence the vulcanizate properties by modification of the mixture production.

U.S. Pat. No. 6,550,508 discloses, for example, tread mixtures based on carbon black as filler, that comprise, for good grip on ice, inter alia, a liquid polymer, for example, polybutadiene.

U.S. Pat. No. 4,840,988 likewise discloses tread mixtures based on carbon black as filler, that comprise liquid polybutadiene for good winter properties.

Liquid polybutadiene having a high vinyl content and a high glass transition temperature ($T_g$) is proposed in U.S. Pat. No. 6,242,523 for tire treads as a substitute for conventional plasticizer oils.

However, the use of liquid polybutadiene in conventional mixtures has a very adverse effect on the dry braking and dry handling of tires.

US 2009/0137718 and US 2009/0137701 disclose, as a substitute for customary plasticizer oils, terminally amine-modified liquid polybutadienes or terminally carboxyl-modified liquid polybutadienes in tread mixtures having a high amount of synthetic rubber. The tires are said to feature a very good balance between low fuel consumption and good adhesion properties, and the ability to suppress cracking at the base of profile grooves while simultaneously maintaining wear resistance.

U.S. Pat. No. 8,580,885 discloses a rubber mixture comprising a functionalized polymer having an Mw of 20 000 g/mol and carbon black as filler in combination with 60 phr of natural rubber.

US 2002/0082333 improves processability by using a triethoxysilane-modified polybutadiene rather than a silane in an NR-free rubber mixture based on synthetic rubber and silica as filler.

SUMMARY OF THE INVENTION

It is therefore desirous to provide a sulfur-crosslinkable rubber mixture that provides excellent performance in the trade-off between rolling resistance and wet grip while keeping other tire properties the same.

This is achieved by the disclosed sulfur-crosslinkable rubber mixture comprising:
- at least one diene rubber,
- at least one silica,
- at least one hydrocarbon resin, and
- 1 to 40 phr of at least one liquid polybutadiene having terminal organosilicon modification and having a weight-average molecular weight Mw by GPC of 500 to 12 000 g/mol.

Surprisingly, the rubber mixtures disclosed herein, by virtue of the combination of the constituents, exhibit excellent properties in the trade-off between rolling resistance and wet grip. Surprisingly, the rubber mixtures disclosed herein also have excellent processibility, especially lower propensity to scorch (premature unwanted pre-crosslinking), especially on extrusion.

Also provided are vehicle tires exhibiting excellent properties in the trade-off between rolling resistance and wet grip, without any significant adverse effect on the other tire properties.

This is achieved in that the vehicle tire, in at least one component, includes at least one vulcanizate of at least one sulfur-crosslinkable rubber mixture having the abovementioned features. In one embodiment, the vehicle tire includes the rubber mixture at least in the tread, such as in the cap in the case of a tread with a cap/base construction.

As used herein, "cap" is understood to mean the part of the tread that comes into contact with the road, being arranged radially on the outside (upper tread portion or tread cap).

As used herein, "base" is understood to mean the part of the tread arranged radially on the inside, and hence does not come into contact with the road in driving operation, or does so only at the end of the tire lifetime (lower tread portion or tread base).

As used herein, "vehicle tires" are understood to mean pneumatic vehicle tires and solid rubber tires, including tires for industrial and construction site vehicles, and truck, car and bicycle tires.

The rubber mixtures disclosed herein are additionally also suitable for treads consisting of various tread mixtures arranged alongside one another and/or one on top of another (multicomponent tread).

The rubber mixtures disclosed herein additionally are also suitable for other industrial rubber articles, such as bellows, conveyor belts, air springs, breaker belts, transmission belts or hoses, and also shoe soles.

DESCRIPTION OF THE PREFERRED EMBODIMENTS OF THE INVENTION

There follows a detailed description of the constituents of the disclosed sulfur-crosslinkable rubber mixtures. All the details given also apply to the disclosed vehicle tires including the rubber mixtures disclosed herein in at least one component.

The unit "phr" (parts per hundred parts of rubber by weight) as used herein is the standard unit of amount for blend recipes in the rubber industry. The dosage of the parts by weight of the individual substances is based in this document on 100 parts by weight of the total mass of all high molecular weight and hence solid rubbers present in the mixture. The polybutadiene having an Mw of 500 to 12 000 g/mol which is present in accordance with the invention is therefore not included as rubber in the hundred parts for the phr calculation.

The abbreviation "phf" (parts per hundred parts of filler by weight) used in this text is the conventional unit of amount for coupling agents for fillers in the rubber industry. As used herein, phf relates to the silica present, meaning that any other fillers present, such as carbon black, are not included in the calculation of the amount of silane.

The weight-average molecular weight Mw and the number-average molecular weight Mn and also the Z-average molecular weight Mz of the polymers and of the described hydrocarbon resins are determined by means of gel permeation chromatography (GPC with tetrahydrofuran (THF) as eluent at 40° C., PPS apparatus, calibrated with polystyrene standard; size exclusion chromatography (SEC) in accordance with BS ISO 11344:2004). As used herein, the abbreviation Mw is used for the weight-average molecular weight.

According to one embodiment, the sulfur-crosslinkable rubber mixture comprises at least one liquid polybutadiene having terminal organosilicon modification and having a weight-average molecular weight Mw by GPC of 500 to 12 000 g/mol. In this context, it is inherent to the range of values for the Mw that the polybutadiene is liquid at room temperature. For the sake of simplicity, therefore, as used herein, the brief expression "liquid polybutadiene" is also used.

The Mw figure is based here on the polybutadiene including the organosilicon modification.

In one embodiment, the liquid polybutadiene is modified with at least one radical of formula I):

$(R^1R^2R^3)Si-$ 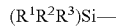 I)

where $R^1$, $R^2$, $R^3$ in the structures can be the same or different and can be one or more of linear or branched alkoxy, cycloalkoxy, alkyl, cycloalkyl, or aryl groups having 1 to 20 carbon atoms, where the radical of formula I) is attached to the polymer chain of the polybutadiene directly or via a bridge, where the bridge consists of a saturated or unsaturated carbon chain that can also contain cyclic and/or aliphatic and/or aromatic elements and heteroatoms in or on the chain.

A modification of this kind results in particularly good rolling resistance indicators.

In one embodiment, all the $R^1$, $R^2$, $R^3$ groups are alkoxy groups. In another embodiment, at least one of the three $R^1$, $R^2$, $R^3$ groups is an ethoxy group. In a further embodiment, each of the three $R^1$, $R^2$, $R^3$ groups is an ethoxy group (abbreviated to OEt). This applies to all the specified embodiments disclosed herein, including the formulae II) and III).

In another embodiment, the radical of formula I) is attached not directly but via a bridge. For instance, a radical including the bridge of formula II) can be thus attached to the polymer chain of the polybutadiene:

$(R^1R^2R^3)Si-Y-X-$ 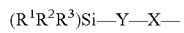 II)

where, in formula II), Y is an alkyl chain ($-CH_2)_n-$, with n=1 to 8, and X is a functional group selected from ester, ether, urethane, urea, amine, amide, thioether, and thioester.

As used herein, "urethane" is understood to mean a $-N(H)-C(O)-O-$ moiety.

In a particularly advantageous embodiment, the liquid polybutadiene is modified with a radical of formula II) in which X=propyl (n=3), Y=urethane ($-N(H)-C(O)-O-$), and the $R^1$, $R^2$ and $R^3$ radicals are each an ethoxy group (OEt).

This gives rise to the formula III) as a structural formula of the organosilicon-modified liquid polybutadiene

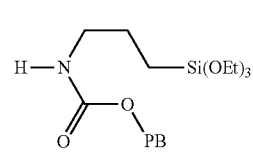 III)

In this formula, PB=polybutadiene and is thus the polymer chain of the monomers.

The liquid polybutadiene has an Mw of 500 to 12 000 g/mol. This gives rise to very good properties in terms of rolling resistance and processibility, since Mw below 12 000 allows liquid dosage owing to the low viscosities.

In a further embodiment, the liquid polybutadiene has an Mw of 1000 to 9000 g/mol. This in turn gives rise to particularly good properties in terms of rolling resistance and processibility.

The liquid polybutadiene can have a glass transition temperature $T_g$ by DSC (Mettler Toledo apparatus; measurement from +70° C. to −150° C., temperature change of 10 K/min; determination of glass transition point analogously to ISO-FDIS 11357-2) of −85 to −30° C., or −60 to −40° C.

This gives rise to particularly good rolling resistance indicators.

The liquid polybutadiene can have a vinyl content (content of 1,2-bonded butadiene, based on the monomers of the polymer chain of the polybutadiene) of 40% to 75%, 50% to 75%, or 55% to 70%.

The liquid polybutadiene can have a 1,4-trans content of 5% to 30% (based on the monomers of the polymer chain of the polybutadiene), or of 10% to 25%.

The cis content of the liquid polybutadiene can be 5% to 30% (based on the monomers of the polymer chain of the polybutadiene), or 10% to 25%.

The features of the microstructure, such as 1,4-trans content, vinyl content, cis content, are determined after completion of synthesis of the liquid polybutadiene (see below) by means of $^{13}C$ NMR (90.5628 MHz; relaxation agent: $Cr(acac)_3$; solvent: $CDCl_3$, Bruker 360 MHz).

The liquid polybutadiene can be prepared, for example, by reaction of 3-isocyanato-n-propyltriethoxysilane with terminally hydroxyl-functionalized polybutadiene (for example, Krasol LBH-P3000) as described in US 2002/0082333.

The amount of the liquid polybutadiene is 1 to 40 phr, 2 to 17 phr, or 5 to 15 phr.

Especially with an amount of 2 to 17 phr, or 5 to 15 phr, the object of excellent performance in the trade-off between rolling resistance and wet grip and good processibility is achieved in a particularly efficient manner.

In one embodiment, the disclosed rubber mixtures comprise at least one hydrocarbon resin. For instance, the disclosed rubber mixtures can contain 3 to 300 phr, 3 to 150 phr, 3 to 100 phr, or even 3 to 85 phr, of at least one hydrocarbon resin.

In a further embodiment, the disclosed rubber mixtures contain 5 to 15 phr of at least one hydrocarbon resin.

In an additional embodiment, the disclosed rubber mixtures contain 40 to 300 phr, 51 to 150 phr, or 51 to 85 phr, of at least one hydrocarbon resin.

It will be clear to the person skilled in the art that hydrocarbon resins are polymers formed from monomers, where the hydrocarbon resin has been formed by the linkage of the monomers to one another, in a formal sense from derivatives of the monomers. As disclosed herein, however, these hydrocarbon resins do not count as rubbers. As used herein, the term "hydrocarbon resins" encompasses resins having carbon atoms and hydrogen atoms and optionally heteroatoms, such as oxygen atoms in particular.

The hydrocarbon resin can be a homopolymer or a copolymer. As used herein, the term "homopolymer" is understood to mean a polymer which, according to the Römpp Online Version 3.28, "has formed from only one kind of monomers."

As used herein, the term "copolymer" is understood to mean a polymer formed from a plurality of, that is, two or more, different monomers. As described herein, the hydrocarbon resin can therefore, for example, also be a copolymer of three different monomers.

The monomers can be all monomers of hydrocarbon resins that are known to those skilled in the art, such as aliphatic $C_5$ monomers, further unsaturated compounds that can be cationically polymerized, comprising aromatics and/or terpenes and/or alkenes and/or cycloalkenes.

The aromatics (aromatic monomers) can, for example, be alpha-methylstyrene and/or styrene and/or vinyltoluene and/or indene and/or coumarone and/or methylindene and/or methylcoumarone and/or phenol.

According to the Rompp Online Lexicon, Version 3.36, the term "olefins" is the "group designation for acyclic and cyclic aliphatic hydrocarbons having one or more reactive C=C double bonds in the molecule, which are nowadays better referred to as alkenes or cycloalkenes, and in the broader sense is also a term for the substituted derivatives thereof . . . ." As described herein, therefore, unsaturated terpenes, alkenes, and cycloalkenes are encompassed by the umbrella term "olefins".

The alkenes can, for example, be 1-butene and/or 2-butene and/or butadiene.

In one embodiment, the disclosed hydrocarbon resins are one or more of aliphatic $C_5$ resins and/or hydrocarbon resins formed from alpha-methylstyrene and styrene.

In another embodiment, the hydrocarbon resins are aliphatic $C_5$ resins. At least one hydrocarbon resin of this kind in the disclosed rubber mixtures achieves particularly good properties with regard to the trade-off between rolling resistance and wet grip.

The aliphatic $C_5$ monomers can be monomers from the $C_5$ mineral oil fraction, for example, isoprene, and/or monomers of the terpenes and/or cycloolefins and/or olefins, for example pentene. $C_5$ is understood to mean that these monomers are formed from five carbon atoms.

Moreover, it is known to the person skilled in the art that the $C_5$ mineral oil fraction, apart from aliphatic monomers having five carbon atoms, can contain other aliphatic monomers (building blocks) having, for example, four carbon atoms, that is, $C_4$ monomers, or six carbon atoms, $C_6$ monomers.

For the sake of simplicity, these monomers, that is, for example, $C_4$ and $C_6$ monomers, are specified herein among the further monomers and are referred to as aliphatic unsaturated $C_4$ monomers or aliphatic unsaturated $C_6$ monomers.

The aliphatic $C_5$ monomer(s) is/are selected from the group comprising isoprene and/or trans-1,3-pentadiene and/or cis-1,3-pentadiene and/or 2-methyl-2-butene and/or 1-pentene and/or 2-pentene.

In one embodiment, the aliphatic $C_5$ monomer(s) is/are one or more of isoprene and/or trans-1,3-pentadiene and/or cis-1,3-pentadiene and/or 2-methyl-2-butene and/or 1-pentene and/or 2-pentene.

In another embodiment, the hydrocarbon resin is a hydrocarbon resin formed from alpha-methylstyrene and styrene.

The hydrocarbon resin present in the rubber mixtures described herein can have a softening point to ASTM E 28 (ring and ball) of 60 to 200° C., 60 to 150° C., 60 to 120° C., 60 to 99° C., or even 80 to 99° C.

In addition, the hydrocarbon resin present in the disclosed rubber mixtures can have a (weight-average) molecular weight $M_w$ of 500 to 4000 g/mol, 1000 to 3000 g/mol, 1300 to 2500 g/mol, 1500 to 2200 g/mol, or even 1500 to 1900 g/mol.

In addition, the hydrocarbon resin present in the disclosed rubber mixtures can have a (Z-average) molecular weight $M_z$ of 2500 to 10 000 g/mol, 2500 to 5000 g/mol, 3000 to 4500 g/mol, 3200 to 4300 g/mol, or even 3400 to 4100 g/mol.

The disclosed rubber mixtures comprise at least one diene rubber having a comparatively high molecular weight compared to the liquid polybutadiene, specifically a weight-average molecular weight Mw by GPC of 250 000 to 5 000 000 g/mol. This at least one diene rubber is the high molecular weight rubber component that constitutes the hundred parts in the calculation of the phr reference parameter, although a mixture of various diene rubbers as described below is also conceivable, where the sum total of all high molecular weight diene rubbers adds up to 100 phr.

Diene rubbers as referred to herein refers to rubbers that arise through polymerization or copolymerization of dienes and/or cycloalkenes and hence have C=C double bonds either in the main chain or in the side groups.

The at least one diene rubber is natural polyisoprene and/or synthetic polyisoprene and/or polybutadiene (butadiene rubber) and/or styrene-butadiene copolymer (styrene-butadiene rubber) and/or epoxidized polyisoprene and/or styrene-isoprene rubber and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Particularly nitrile rubber, hydrogenated acrylonitrile-butadiene rubber, chloroprene rubber, butyl rubber, halobutyl rubber, or ethylene-propylene-diene rubber are used in the production of industrial rubber articles such as breaker belts, transmission belts and hoses, and/or shoe soles.

In one embodiment, the diene rubber(s), however, is/are natural polyisoprene (NR) and/or synthetic polyisoprene (IR) and/or polybutadiene (BR, butadiene rubber) and/or styrene-butadiene copolymer (SBR, styrene-butadiene rubber).

The natural and/or synthetic polyisoprene can be either cis-1,4-polyisoprene or 3,4-polyisoprene. For example, cis- 1,4-polyisoprenes with a cis 1,4 content >90% by weight can be used. Firstly, it is possible to obtain such a polyisoprene by stereospecific polymerization in solution with Ziegler-Natta catalysts or using finely divided lithium alkyls.

Secondly, natural rubber (NR) is one such cis-1,4-polyisoprene; the cis-1,4 content in the natural rubber is greater than 99% by weight.

In addition, also provided is a mixture of one or more natural polyisoprenes with one or more synthetic polyisoprenes.

The natural and/or synthetic polyisoprenes can have a weight-average molecular weight Mw by GPC of 250 000 to 5 000 000 g/mol and thus count among the high molecular weight rubbers that form the hundred parts in the calculation of the phr reference parameter.

The styrene-butadiene rubber (styrene-butadiene copolymer) can be either solution-polymerized styrene-butadiene rubber (SSBR) or emulsion-polymerized styrene-butadiene rubber (ESBR), and it is also possible to use a mixture of at least one SSBR and at least one ESBR. The terms "styrene-butadiene rubber" and "styrene-butadiene copolymer" are used synonymously herein. In one example, styrene-butadiene copolymers having an Mw of 250 000 to 600 000 g/mol (two hundred and fifty thousand to six hundred thousand grams per mole) are used.

The styrene-butadiene copolymer(s) used can be end group-modified and/or functionalized along the polymer chains with modifications and functionalizations. The modification can be one with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, further modifications known to the expert, also referred to as functionalizations, are also an option. Part of such functionalizations can be metal atoms.

The butadiene rubber (=BR, polybutadiene) can be any of the types known to those skilled in the art having an Mw of 250 000 to 5 000 000 g/mol. These include what are called the high-cis and low-cis types, polybutadiene having a cis content of not less than 90% by weight being referred to as high-cis type and polybutadiene having a cis content of less than 90% by weight as low-cis type. An example of a low-cis polybutadiene is Li—BR (lithium-catalyzed butadiene rubber) having a cis content of 20% to 50% by weight. A high-cis BR achieves particularly good abrasion properties and low hysteresis of the rubber mixture.

The polybutadiene used can have been end group-modified and/or functionalized along the polymer chains with the modifications and functionalizations specified above for the styrene-butadiene rubber.

In one embodiment, the rubber mixture comprises natural polyisoprene (NR) and SSBR. For instance, amounts of 1 to 50 phr, 5 to 35 phr of NR, or even 15 to 35 phr of NR and correspondingly 50 to 99 phr of SSBR, 65 to 95 phr of SSBR, or 65 to 85 phr of SSBR.

This gives rise to particularly good properties with regard to the object to be achieved, and additionally good processibility, especially miscibility and extrusion characteristics, of the rubber mixture.

The rubber mixtures disclosed herein comprise at least one silica. For instance, the rubber mixtures can contain 20 to 200 phr, or 40 to 165 phr, of at least one silica.

In one embodiment, the disclosed rubber mixture contains 70 to 100 phr of at least one silica.

In a further embodiment, the rubber mixtures contain 90 to 120 phr of at least one silica.

The silicas can be the silicas known to those skilled in the art that are suitable as filler for tire rubber mixtures. For example, a finely divided precipitated silica having a nitrogen surface area (BET surface area) (in accordance with DIN ISO 9277 and DIN 66132) of 35 to 350 $m^2/g$, 60 to 260 $m^2/g$, or 120 to 230 $m^2/g$, and a CTAB surface area (in accordance with ASTM D 3765) of 30 to 400 $m^2/g$, 60 to 250 $m^2/g$, or 120 to 230 $m^2/g$ can be used. Such silicas lead, for example in rubber mixtures for tire treads, to particularly good physical properties of the vulcanizates. In addition, advantages can arise in processing of the mixture as a result of a reduction in the mixing time while maintaining the same product properties that lead to improved productivity. Silicas used can thus, for example, be either those of the Ultrasil® VN3 type (trade name) from Evonik or highly dispensible silicas known as HD silicas (for example, Zeosil® 1165 MP from Solvay).

In another embodiment, the disclosed rubber mixtures are free of carbon black. That is, the rubber mixtures can contain 0 phr of carbon black.

In a further embodiment, the disclosed rubber mixtures can also comprise at least one carbon black in amounts of 0.1 to 30 phr, 0.1 to 10 phr, or 0.1 to 5 phr. If carbon black is present, a small amount of 0.1 to 5 phr for the purpose of improved rolling resistance indicators can be included.

If the rubber mixture comprises carbon black, all types of carbon black known to those skilled in the art are conceivable. For example, a carbon black having an iodine absorption number to ASTM D 1510 of 30 to 180 g/kg, or 30 to 130 g/kg, and a DBP number to ASTM D 2414 of 80 to 200 mL/100 g, 100 to 200 mL/100 g, or 100 to 180 mL/100 g can be used.

For the vehicle tires disclosed herein, the inclusion of the disclosed rubber mixtures achieves particularly good rolling resistance indicators (rebound resilience at 70° C.) combined with other good tire properties.

The rubber mixtures disclosed herein can, as well as silica and optionally carbon black, also comprise further known polar and/or nonpolar fillers, such as aluminosilicates, chalk, starch, magnesium oxide, titanium dioxide, or rubber gels.

Additionally, conceivable are carbon nanotubes (CNTs, including discrete CNTs, what are called hollow carbon fibers (HCFs) and modified CNTs containing one or more functional groups, such as hydroxyl, carboxyl and carbonyl groups). Graphite and graphenes, and also "carbon-silica dual-phase filler", are also conceivable as filler.

As described herein, zinc oxide is not counted as being among the fillers.

To improve processibility and for binding of the silica and any other polar fillers present to the diene rubber, one can use silane coupling agents in rubber mixtures. For instance, one can use one or more different silane coupling agents in combination with one another. The rubber mixtures disclosed herein therefore can comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. As silane coupling agents, one can use all silane coupling agents known to those skilled in the art for use in rubber mixtures. Such coupling agents known from the prior art include bifunctional organosilanes that have at least one alkoxy, cycloalkoxy, or phenoxy group as a leaving group on the silicon atom and have, as another functionality, a group that can, optionally after dissociation, undergo a chemical reaction with the double bonds of the polymer. The latter group can, for example, be one of the following chemical groups:

—SCN, —SH, —NH$_2$ or —S$_x$— (where x=2 to 8).

For instance, silane coupling agents can, for example, be 3-mercaptopropyltriethoxysilane, 3-thiocyanatopropyltrimethoxysilane or 3,3'-bis(triethoxysilylpropyl) polysulfides having 2 to 8 sulfur atoms, for example, 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (trade name: X50S® from Evonik).

In one embodiment, a silane mixture comprising disulfides in an amount of 40% to 100% by weight, 55% to 85% by weight of disulfides, or 60% to 80% by weight of disulfides can be used. A mixture of this kind is available, for example, under the Si 261® trade name from Evonik, which is described, for example, in U.S. Pat. No. 8,252,863.

Blocked mercaptosilanes, as known, for example, from WO 99/09036, can also be used as silane coupling agent. One can also use silanes as described in U.S. Pat. No. 7,968,633; U.S. Pat. No. 7,968,636; U.S. Pat. No. 7,968,635; and, U.S. Pat. No. 7,968,634. It is possible to use, for example, silanes which are marketed under the NXT name (for example, 3-(octanoylthio)-1-propyltriethoxysilane) in a number of variants from Momentive, USA, or those which are marketed under the name VP Si 363® by Evonik Industries. One can also use one of the abovementioned mercaptosilanes, such as 3-mercaptopropyltriethoxysilane, in combination with processing aids (that are listed below), such as PEG carboxylates.

In one embodiment, the disclosed rubber mixtures comprise a combination of 3-mercaptopropyltriethoxysilane and PEG carboxylates, which results in particularly good properties, especially with regard to the technical problem to be solved, and a good level of properties overall with regard to the other properties.

In addition, the rubber mixture can comprise further activators and/or agents for the binding of fillers, especially carbon black. The latter can, for example, be the compound S-(3-aminopropyl)thiosulfuric acid as disclosed, for example, in US 2013/0131240, and/or metal salts thereof, which gives rise to very good physical properties of the rubber mixture especially in combination with at least one carbon black as filler.

The silanes and activators mentioned can be added in at least one base-mixing stage in the production of the rubber mixture.

In one embodiment, the disclosed rubber mixtures comprise at least one silane coupling agent as described above, not counting the organosilicon-modified liquid polybutadiene. In this embodiment, the disclosed rubber mixture thus comprises the organosilicon-modified liquid polybutadiene and at least one silane coupling agent that can be selected from one or more of 3-(octanoylthio)-1-propyltriethoxysilane and 3,3'-bis(triethoxysilylpropyl) tetrasulfide (TESPT) and 3,3'-bis(triethoxysilylpropyl) disulfide (TESPD). In the case of the triethoxysilylpropyl sulfides, as described above, a mixture with other sulfides can also be used, such as a proportion of S$_2$ silane (bis(triethoxysilylpropyl) disulfide) of 40% to 100% by weight, based on the total amount of silane.

This gives rise to particularly good rolling resistance indicators in combination with other very good tire properties and good processability of the rubber mixture.

In another embodiment, it is advantageous when the rubber mixture comprises at least one plasticizer (in addition to the liquid polybutadiene mentioned), where the total amount of plasticizer is 1 to 90 phr, 5 to 70 phr, or 15 to 60 phr. In combination with the abovementioned constituents, this results in particularly good processibility of the rubber mixture, especially of the extrudates prior to crosslinking, with simultaneously good rolling resistance indicators.

The plasticizers used herein include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL), such as those having a content of polycyclic aromatics of less than 3% by weight according to method IP 346 or rapeseed oil or factices or liquid polymers that do not correspond to the above-described modified liquid polybutadiene and have a mean molecular weight (determination by GPC=gel permeation chromatography, in accordance with BS ISO 11344:2004) between 500 and 20 000 g/mol. If additional liquid polymers are used as plasticizers in the rubber mixture of the invention, these are likewise not counted as rubber in the calculation of the composition of the polymer matrix.

The plasticizer can be any of the abovementioned plasticizers.

Mineral oils can also be used as plasticizer. One or more of the following mineral oils can be used: DAE (distilled aromatic extracts) and/or RAE (residual aromatic extracts) and/or TDAE (treated distillate aromatic extracts) and/or MES (mild extracted solvents) and/or naphthenic oils.

The plasticizer(s) can be added in at least one base-mixing stage in the production of the rubber mixture of the invention.

In addition, the rubber mixture can comprise standard additives in customary proportions by weight that can be added in at least one base-mixing stage in the course of production thereof. These additives include:
a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), and 2,2,4-trimethyl-1,2-dihydroquinoline (TMQ),
b) activators, for example zinc oxide and fatty acids (for example, stearic acid) or zinc complexes, for example zinc ethylhexanoate,
c) waxes,
d) masticating aids, for example 2,2'-dibenzamidodiphenyl disulfide (DBD), and
e) processing aids, for example fatty acid salts, for example zinc soaps, and fatty acid esters and derivatives thereof.

The proportion of the total amount of further additives is 3 to 150 phr, 3 to 100 phr, or 5 to 80 phr.

The total proportion of the further additives includes 0.1 to 10 phr, 1 to 8 phr, or 1.5 to 4 phr, of zinc oxide (ZnO).

All types of zinc oxide known to those skilled in the art, for example ZnO granules or powders, are possible here. The zinc oxide conventionally used generally has a BET surface area of less than 10 m$^2$/g. However, one can also use a zinc oxide having a BET surface area of 10 to 100 m$^2$/g, for example those that are called "nano-zinc oxides".

It is customary to add zinc oxide as an activator, usually in combination with fatty acids (for example, stearic acid), to a rubber mixture for sulfur crosslinking with vulcanization accelerators. The sulfur is then activated by complex formation for the vulcanization.

The rubber mixture can also comprise bonding systems, for example cobalt salts and reinforcer resins (for example, resorcinol-HMMM/HMT), for use in body mixtures, especially rubberizing mixtures.

The vulcanization of the disclosed sulfur-crosslinkable rubber mixtures is conducted in the presence of sulfur and/or sulfur donors with the aid of vulcanization accelerators, it being possible for some vulcanization accelerators to act simultaneously as sulfur donors. The accelerator can be one or more of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

For example, one can use one or more sulfenamide accelerators selected from N-cyclohexyl-2-benzothiazole-sulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur-donating substances used can be any of the sulfur-donating substances known to those skilled in the art. If the rubber mixture comprises a sulfur-donating substance, it can be one or more of thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (for example, Rhenocure SDT 50®, Rheinchemie GmbH) and/or zinc dichloryldithiophosphate (for example, Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in U.S. Pat. No. 8,182,626 can also be used in the rubber mixture. This system comprises a vulcanizing agent which crosslinks with a functionality of greater than four and at least one vulcanization accelerator. The vulcanizing agent which crosslinks with a functionality of greater than four has, for example, the general formula A):

$$G[C_aH_{2a}-CH_2-S_bY]_c \qquad A)$$

where G is a polyvalent cyclic hydrocarbon group and/or a polyvalent heterohydrocarbon group and/or a polyvalent siloxane group containing 1 to 100 atoms; where each Y is selected independently from a rubber-active group containing sulfur-containing functionalities; and where a, b and c are integers with, independently, a=0 to 6; b=0 to 8; and c=3 to 5.

The rubber-active group can be a thiosulfonate group, a dithiocarbamate group, a thiocarbonyl group, a mercapto group, a hydrocarbon group, or a sodium thiosulfonate group (Bunte salt group).

Very good abrasion and tear properties of the disclosed rubber mixtures are achieved in this way.

As described herein, sulfur and sulfur donors, including sulfur-donating silanes such as TESPT, and vulcanization accelerators as described above and vulcanizing agents that crosslink with a functionality of greater than four, as described in U.S. Pat. No. 8,182,626, for example a vulcanizing agent of the formula A), and also the abovementioned Vulkuren®, Duralink® and Perkalink® systems are encompassed by the term "vulcanizing agent".

In the course of production of the disclosed rubber mixtures, one can add at least one vulcanizing agent selected from sulfur and/or sulfur donors and/or vulcanization accelerators and/or vulcanizing agents that crosslink with a functionality of greater than four to the rubber mixture, in the ready-mixing stage. This makes it possible to produce a sulfur-crosslinked rubber mixture from the finished mixture by vulcanization, especially for use in the vehicle tire.

For example, one can use the accelerators TBBS and/or CBS and/or diphenylguanidine (DPG).

In addition, vulcanization retarders can be present in the rubber mixture.

The terms "vulcanized" and "crosslinked" are used synonymously herein.

In one embodiment, in the production of the disclosed sulfur-crosslinkable rubber mixtures, two or more accelerators are added in the ready-mixing stage.

The disclosed sulfur-crosslinkable rubber mixtures can be prepared by the process customary in the rubber industry, in which, in one or more mixing stages, a base mix comprising all the constituents except the vulcanization system (sulfur and vulcanization-influencing substances) is first produced. The finished mixture is produced by adding the vulcanization system in a final mixing stage. The finished mixture is processed further, for example, by an extrusion operation and converted to the appropriate shape.

This is followed by further processing by vulcanization, in the course of which sulfur crosslinking takes place owing to the vulcanization system added.

The above-described rubber mixtures are particularly suitable for use in vehicle tires, such as pneumatic vehicle tires. In this context, the rubber mixtures can be incorporated into all tire components, such as the tread and/or the sidewall and/or in at least one inner component.

"Body mixture" refers herein to the rubber mixtures for the inner components of a tire. Inner tire components refer essentially to the squeegee, sidewall, inner liner, core profile, breaker belt, shoulder, breaker belt profile, carcass, bead reinforcement, bead profile, flange profile, and bandage.

In one embodiment, the disclosed rubber mixtures can be incorporated into the treads of vehicle tires, for instance at least in the cap of treads with cap/base construction.

For use in vehicle tires, the mixture can be brought into the shape of a tread, for instance at least into the shape of a tread cap, as a finished mixture prior to vulcanization, and applied in the known manner in the production of the vehicle tire blank. However, the tread, i.e., at least the tread cap, can also be rolled up in the form of a narrow strip of rubber mixture onto a tire blank. In the case of two-part treads (upper part: cap and lower part: base), the disclosed rubber mixtures can be used both for the cap and for the base.

The production of the disclosed rubber mixtures for use as body mixture in vehicle tires is effected as described above for the tread. The difference lies in the shaping after the extrusion operation or the calendering of the mixture. The shapes of the as yet unvulcanized rubber mixture for one or more different body mixtures that are obtained in this way then serve for the construction of a tire blank. For use of the rubber mixture of the invention in transmission belts and breaker belts, especially in conveyor belts, the extruded, as yet unvulcanized mixture is converted to the appropriate shape and frequently provided at the same time or subsequently with strengthening members, for example synthetic fibers or steel cords. This usually gives rise to a multilayer construction consisting of one and/or more plies of rubber mixture, one and/or more plies of identical and/or different strengthening members and one and/or more further plies of the same and/or another rubber mixture.

The disclosed rubber mixtures are now elucidated in detail by comparative and working examples that are summarized in Tables 1 and 2.

The comparative mixtures are identified by C, the inventive mixtures by I.

The terminally organosilicon-modified liquid polybutadiene was prepared by reaction of 3-isocyanato-n-propyltriethoxysilane with terminally hydroxyl-functionalized polybutadiene (Krasol LBH-P3000), analogously to the description in US 2002/0082333, paragraph [0053], using 155 g of 3-isocyanato-n-propyltriethoxysilane per kg of Krasol LBH-P3000. The reaction was conducted at 80° C. in a 5 L (liter) reactor.

The mixture was produced by the process customary in the rubber industry under standard conditions in three stages in a laboratory mixer, in which all the constituents apart from the vulcanization system (sulfur and vulcanization-influencing substances) were first mixed in the first mixing stage (base-mixing stage). In the second mixing stage, the base mix was mixed once more. By addition of the vulcanization system in the third stage (ready-mixing stage), the finished mixture was produced, with mixing at 90 to 120° C.

All the mixtures were used to produce test specimens by vulcanization after 20 minutes under pressure at 160° C., and these test specimens were used to determine material properties that are typical for the rubber industry by the test methods specified hereinafter.

Mooney viscosity (ML1+3), to ASTM D1646 (Mooney units abbreviated to M.U.)

conversion time of 10% ($t_{10}$ scorch time) conversion by means of rotorless vulcameter (MDR=moving disk rheometer) to ASTM D 5289-12/ISO 6502

Shore A hardness at room temperature (RT) and at 70° C. to DIN ISO 7619-1 rebound resilience (Rebound) at RT and 70° C. to DIN 53 512

Substances Used
a) NR: TSR natural rubber
b) SBR: SSBR, SLR-4601, from Trinseo
c) Ultrasil® VN3 silica, from Evonik
d) liquid polybutadiene, organosilicon-modified, obtained as described above,
  vinyl content=63.3%, trans content=17.5%, cis content=19%, $T_g$=−56° C.,
  Mw=7400 g/mol Mn=6300 g/mol, polymer with modification as per formula III)
e) plasticizer: 5 phr of rapeseed oil+remainder MES (unit: phr)
f) additives: 5.2 phr of aging stabilizer (DTPD, 6PPD, TMQ),
  2 phr of antiozonant wax, 2 phr of zinc oxide (ZnO), 1 phr of stearic acid,
  4 phr of processing aids (fatty acid esters and zinc soaps)
g) $S_2$ silane: TESPD, JH-S75, from Jingzhou Jianghan Fine Chemical
h) hydrocarbon resin: a-methylstyrene-styrene resin, Sylvares® SA 85, from Arizona Chemical, Mw=1200 g/mol, Mz=1900 g/mol;
SP to ASTM E 28 (ring and ball)=85° C.
i) accelerator: 2 phr of DPG, 2 phr of CBS
j) soluble sulfur
k) SSBR Sprintan SLR-3402, from Trinseo
l) plasticizer: liquid polybutadiene (unmodified, MW=8000 g/mol), LBR307, from Kuraray
m) accelerator: 3 phr of DPG+2.4 phr of CBS
n) hydrocarbon resin: aliphatic $C_5$ resin: Piccotac™ 1095-N, from Eastman Chemical Company, Mw=1700 g/mol, Mz=3500 g/mol; SP=94° C.

TABLE 1

| Constituents | Unit | C1 | C2 | C3 | I1 |
|---|---|---|---|---|---|
| NR [a] | phr | 30 | 30 | 30 | 30 |
| SBR [b] | phr | 70 | 70 | 70 | 70 |
| N339 carbon black | phr | 5 | 5 | 5 | 5 |
| Silica [c] | phr | 86 | 86 | 86 | 86 |
| Liq. PB [d] | phr | — | 15 | — | 15 |
| Plasticizer [e] | phr | 25 | 25 | 17 | 17 |
| HC resin [h] | phr | — | — | 10 | 10 |
| Additives [f] | phr | 14.2 | 14.2 | 14.2 | 14.2 |
| Silane [g] | phf | 7.2 | 7.2 | 7.2 | 7.2 |
| Accel. [i] | phr | 4 | 4 | 4 | 4 |
| S [j] | phr | 1.7 | 1.7 | 1.7 | 1.7 |
| Physical properties | | | | | |
| Viscosity | M.U. | 61 | 49 | 66 | 52 |
| $t_{10}$ | min. | 2.9 | 4.9 | 2.8 | 5.3 |
| Hardness RT | Shore A | 67 | 66 | 68 | 66 |
| Hardness 70° C. | Shore A | 61 | 60 | 64 | 60 |
| Rebound RT | % | 24.4 | 27.1 | 19.1 | 23.1 |
| Rebound 70° C. | % | 46.9 | 49.6 | 45.8 | 49.4 |
| Rebound difference | | 22.5 | 22.5 | 26.7 | 26.3 |

TABLE 2

| Constituents | Unit | C4 | C5 | C6 | I2 | C7 | I3 |
|---|---|---|---|---|---|---|---|
| NR [a] | phr | 20 | 20 | 20 | 20 | 20 | 20 |
| SBR [k] | phr | 80 | 80 | 80 | 80 | 80 | 80 |
| N339 carbon black | phr | 5 | 5 | 5 | 5 | 5 | 5 |
| Silica [c] | phr | 110 | 110 | 110 | 110 | 110 | 110 |
| Liq. PB [d] | phr | — | 15 | — | 15 | — | 15 |
| HC resin [h] | phr | — | — | 10 | 10 | — | — |
| HC resin [n] | phr | — | — | — | — | 10 | 10 |
| Plasticizer [l] | phr | 49 | 49 | 39 | 39 | 39 | 39 |
| Additives [f] | phr | 14.2 | 14.2 | 14.2 | 14.2 | 14.2 | 14.2 |
| Silane [g] | phf | 7.2 | 7.2 | 7.2 | 7.2 | 7.2 | 7.2 |
| Accel. [m] | phr | 5.4 | 5.4 | 5.4 | 5.4 | 5.4 | 5.4 |
| S [j] | phr | 2.0 | 2.0 | 2.0 | 2.0 | 2.0 | 2.0 |
| Physical properties | | | | | | | |
| Viscosity | M.U. | 68 | 60 | 77 | 63 | 76 | 64 |
| $t_{10}$ | min. | 0.7 | 4.2 | 0.5 | 4.2 | 0.5 | 3.8 |
| Hardness RT | Shore A | 60 | 56 | 63 | 57 | 63 | 58 |
| Hardness 70° C. | Shore A | 53 | 50 | 56 | 52 | 57 | 53 |
| Rebound RT | % | 30.4 | 32.3 | 28.2 | 31.1 | 29.3 | 31.4 |
| Rebound 70° C. | % | 40.6 | 44.3 | 40.8 | 45.5 | 41.6 | 45.7 |
| Rebound difference | | 10.2 | 12 | 12.6 | 14.4 | 12.3 | 14.3 |

As can be inferred from Tables 1 and 2, the inventive rubber mixtures I1, I2 and I3, through the combination of organosilicon-modified liquid polybutadiene and at least one hydrocarbon resin, achieve excellent performance in the trade-off between rolling resistance and wet grip, which can be seen from the elevated values for the difference in rebound resiliences (rebound resilience at 70° C. minus rebound resilience at room temperature).

Moreover, the inventive rubber mixtures exhibit excellent processability, which can be seen especially from the elevated scorch times $t_{10}$. If this time is too short, the rubber mixture has a tendency to scorching in the course of extrusion. The inventive rubber mixtures I1, I2 and I3 thus have elevated scorch-proofing.

It is understood that the foregoing description is that of various embodiments and that various changes and modifications can be made thereto without departing from the spirit and scope of the disclosed rubber mixtures and their uses.

What is claimed is:

1. A sulfur-crosslinkable rubber mixture comprising:
   at least one diene rubber,
   at least one silica,
   at least one hydrocarbon resin, and
   1 to 40 phr of at least one liquid polybutadiene having terminal organosilicon modification and having a weight-average molecular weight Mw by GPC of 500 to 12 000 g/mol.

2. The rubber mixture according to claim 1, wherein the at least one liquid polybutadiene is modified with at least one radical of formula I):

$$(R^1R^2R^3)Si— \quad \text{I)}$$

wherein:
R$^1$, R$^2$, R$^3$ are the same or different and are selected from: linear or branched alkoxy, cycloalkoxy, alkyl, cycloalkyl, or aryl groups having 1 to 20 carbon atoms, the radical of formula I) is attached to the polymer chain of the at least one liquid polybutadiene directly or via a bridge, and
the bridge consists of a saturated or unsaturated carbon chain that optionally comprises cyclic aliphatic or aromatic elements and heteroatoms in or on the carbon chain.

3. The rubber mixture according to claim 2, wherein the radical of formula I) is attached not directly but via a bridge of formula II):

$$(R^1R^2R^3)Si—Y—X— \quad \text{II)}$$

wherein:
Y is an alkyl chain (—CH$_2$)$_n$— with n=1 to 8, and
X is a functional group selected from the group consisting of: ester, ether, urethane, urea, amine, amide, thioether, and thioester.

4. The rubber mixture according to claim 3, wherein the organosilicon-modified at least one liquid polybutadiene has a structure of formula III):

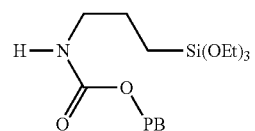

5. The rubber mixture according to claim 1, wherein the at least one liquid polybutadiene with terminal organosilicon modification has a glass transition temperature T$_g$ by DSC of −85 to −30° C.

6. The rubber mixture according to claim 1, wherein the at least one liquid polybutadiene having terminal organosilicon modification is present in the mixture in an amount of 2 to 17 phr.

7. The rubber mixture according to claim 1, wherein the hydrocarbon resin has a softening point to ASTM E 28 of 60 to 99° C.

8. The rubber mixture according to claim 1, wherein the hydrocarbon resin has a molecular weight Mw of 500 to 4000 g/mol and a Z-average molecular weight Mz of 2500 to 10 000 g/mol.

9. The rubber mixture according to claim 1, wherein the hydrocarbon resin is an aliphatic C$_5$ resin and/or a hydrocarbon resin formed from alpha-methylstyrene and styrene.

10. A vehicle tire comprising at least one component comprising the sulfur-vulcanized rubber mixture according to claim 1.

11. The vehicle tire according to claim 10, where the at least one component is a tire tread.

* * * * *